US 9,020,944 B2

(12) United States Patent
Srivastava et al.

(10) Patent No.: US 9,020,944 B2
(45) Date of Patent: Apr. 28, 2015

(54) SYSTEMS AND METHODS FOR ORGANIZING DOCUMENTED PROCESSES

(75) Inventors: Biplav Srivastava, Noida (IN); Debdoot Mukherjee, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 12/608,435

(22) Filed: Oct. 29, 2009

(65) Prior Publication Data

US 2011/0106801 A1 May 5, 2011

(51) Int. Cl.
*G06F 17/30* (2006.01)
*G06Q 10/10* (2012.01)

(52) U.S. Cl.
CPC .......... *G06Q 10/10* (2013.01); *G06F 17/30598* (2013.01)

(58) Field of Classification Search
CPC ................................................ G06F 17/30598
See application file for complete search history.

(56) References Cited

U.S. PATENT DOCUMENTS

| | | | | |
|---|---|---|---|---|
| 5,623,681 A * | 4/1997 | Rivette et al. | | 715/255 |
| 5,987,171 A * | 11/1999 | Wang | | 382/173 |
| 6,826,568 B2 * | 11/2004 | Bernstein et al. | | 707/749 |
| 7,065,705 B1 * | 6/2006 | Wang et al. | | 715/209 |
| 7,089,241 B1 * | 8/2006 | Alspector et al. | | 1/1 |
| 7,225,399 B2 * | 5/2007 | Watson | | 715/210 |
| 7,305,412 B2 | 12/2007 | Chau et al. | | |
| 7,331,016 B2 * | 2/2008 | Williams et al. | | 707/714 |
| 7,716,169 B2 * | 5/2010 | Park et al. | | 707/602 |
| 7,716,581 B2 * | 5/2010 | Tran | | 715/273 |
| 8,196,030 B1 * | 6/2012 | Wang et al. | | 715/200 |
| 8,312,067 B2 * | 11/2012 | Elias et al. | | 707/931 |
| 8,352,857 B2 * | 1/2013 | Filippova et al. | | 715/256 |
| 8,587,613 B2 * | 11/2013 | Wang et al. | | 345/619 |
| 2002/0178134 A1 * | 11/2002 | Waltz et al. | | 706/48 |
| 2003/0048265 A1 * | 3/2003 | Bito et al. | | 345/419 |
| 2003/0126129 A1 * | 7/2003 | Watson | | 707/6 |
| 2004/0167795 A1 | 8/2004 | Tanaka et al. | | |
| 2006/0136888 A1 * | 6/2006 | Klein | | 717/162 |
| 2006/0143073 A1 * | 6/2006 | Engel et al. | | 705/10 |
| 2006/0248053 A1 * | 11/2006 | Sanfilippo et al. | | 707/3 |
| 2007/0005618 A1 | 1/2007 | Ivanov et al. | | |
| 2007/0006134 A1 | 1/2007 | Larvet et al. | | |
| 2007/0011175 A1 * | 1/2007 | Langseth et al. | | 707/100 |
| 2007/0276711 A1 | 11/2007 | Shiu et al. | | |
| 2007/0277151 A1 | 11/2007 | Brunel et al. | | |
| 2008/0228536 A1 * | 9/2008 | Suenbuel et al. | | 705/7 |
| 2009/0018983 A1 * | 1/2009 | El-Rafei et al. | | 706/12 |
| 2009/0037236 A1 * | 2/2009 | Miller et al. | | 705/7 |

(Continued)

OTHER PUBLICATIONS

Bae et al. ("Process Mining, Discovery, and Integration using Distance Measures," Web Services, 2006. ICWS '06. International Conference on , vol., no., pp. 479-488, Sep. 18-22, 2006.*

(Continued)

*Primary Examiner* — Richard Bowen
(74) *Attorney, Agent, or Firm* — Ference & Associates LLC

(57) ABSTRACT

Embodiments of the invention provide systems and methods for applying Business Process Management (BPM) to enterprises having business processes documented in multiple representations. Embodiments of the invention reconcile and organize documented information about processes into groups that convey inter-process similarity. The discovered knowledge can be used by embodiments of the invention for many applications to find process clusters that significantly boost performance.

16 Claims, 10 Drawing Sheets

(56) References Cited

U.S. PATENT DOCUMENTS

| | | | |
|---|---|---|---|
| 2009/0125796 A1* | 5/2009 | Day et al. | 715/219 |
| 2009/0144609 A1* | 6/2009 | Liang et al. | 715/230 |
| 2009/0182625 A1* | 7/2009 | Kilger et al. | 705/10 |
| 2009/0228777 A1* | 9/2009 | Henry et al. | 715/230 |
| 2009/0240726 A1* | 9/2009 | Carter et al. | 707/103 R |
| 2009/0265634 A1* | 10/2009 | Beringer et al. | 715/733 |
| 2010/0004923 A1* | 1/2010 | Bogl et al. | 704/9 |
| 2010/0153345 A1* | 6/2010 | Ginkel et al. | 707/690 |

OTHER PUBLICATIONS

Gilbert et al. "The New Data Integration Frontier: Unifying Structured and Unstructured Data," 2006 Gartner, Inc., Publication Date: Mar. 31, 2006.*

Srivastava et al. "Organizing Documented Processes," Sep. 21-25, 2009, SCC '09. IEEE International Conference on Services Computing, pp. 25-32.*

Hepp, Martin, Hinkelmann, Knut, Karagiannis, Dimitris, Klein, Rudiger, and Stojanovic, Nenad, "Proceedings of the Workshop on Semantic Business Process and Product Lifecycle Management", SBPM 2007, in Conjunction with the 3rd European Semantic Web Conference (ESWC 2007), Innsbruck, Austria, Jun. 7, 2007.

www.infosys.com/research/publications/SETLabs-briefings-BPM.pdf, Business Process Management, SETLabs Briefings, vol. 2, No. 3, Jul.-Sep. 2004.

www.infosci-journals.com, "General Adaption Framework: Enabling Interoperability for Industrial Web Resources", IDEA Group Publishing, International Journal on Semantic Web & Information Systems, 2005.

www.se.uni-hannover.de/semsoa-2007, "Software Engineering Methods for Service-Oriented Architecture 2007", SEMSOA 2007, Workshop.

* cited by examiner

MyCompany ERP
Project
Process Definition Document

| Process | PDD01_Maintain GL Account | | |
|---|---|---|---|
| Team | BAR-Budget, Analysis and Reporting | Owner | Person 1 |
| Approver | Person 2 | | |
| Version | Ver #1 | | |

☐ <u>User Requirements Specification Completed</u>

Section 1: Definition

Description
We give some esoteric description. Based on a change Control Request form, this process will provide us with the ability to maintain the master records for the GL accounts in the FI module of SAP. As a result of this action, we can create, change, or delete a GL account...

Triggers

Corporate Reorganizations, Acquisitions, Statutory and Management requirements are events…SAP.

Dependence/Requirements
•Company Code
•Chart of Accounts
•Some dependency
•More dependency Inputs

•Request to create, change, or display a GL Account

FIG. 1A

MyCompany ERP
Project
Process Definition Document

Supplier

- Accounts Payable
- Accounts Receivable
- More suppliers

Outputs

- A created, changed, blocked of a flag...
- Interface file with updated GL Account
- More outputs Customers

- Corporate Accounting
- External Interfaces
- More customers

Steps

| No. | Action | By Who | System/Manual |
|---|---|---|---|
| 1 | The Finance Control Group Accesses... | Finance Control | Manual |
| 2 | GL Master Data receives the... | GL Master Data Admin | Manual |
| 3 | Should new account attributes be... | SAP Production Support | System |

FIG. 1B

*Algorithm*: FindSimilarProcessesFromDocs
*Inputs*: $\$D$: a set of process documents with their content pieces tagged,
$\varphi$: a threshold for document similarity
*Output*: Set $\mathbf{G} = \{g_1, ..., g_k\}$ where $g_i \subseteq \mathbf{D}$

*Main Steps*
1. Let $SSP = FindSimilarProcessPairsFromDoc(\$D, \varphi)$
2. $\mathbf{G} = BuildClustersbyTransitiveClosure(SSP)$

*Sub-Routine*: FindSimilarProcessPairsFromDoc
*Inputs*: $\$D$: a set of process documents with their content pieces tagged
$\varphi$: threshold
*Output*: Set $\$SP$ of similar document(process) pairs
1. For each pair of documents
2. For each tag in both documents
3.    Compare content and record their similarity score $\theta$
4. Aggregate similarity score for all tags
5. Compare score with threshold and decide similarity
6. Build list of pair of similar process documents and return

FIG. 4A

*Sub-Routine:* BuildClustersbyTransitiveClosure
*Inputs:* $SP$: a set of similar process pairs
*Outputs:* Set G 1. $Clusters = {}
2. For each pair in passed $SP
3. $seed = pick first process of pair
4. $ACluster = BuildAClusterWithGivenSeed$(i, $SP)$
   :: Note: $SP can get reduced by side-effect.
5. Add $ACluster to $Clusters
6. Return $Clusters

FIG. 4B

*Sub-Routine:* BuildAClusterWithGivenSeed
*Inputs:* $seed: a process all of whose neighbors have to be found
$SP: a set of similar process pairs

*Output:* Set $g_i$
1. $ClusterOfSeedProcess = {}
2. For each process $i$ similar to seed process
3.    Add $i$ to $ClusterOfSeedProcess
4.    Remove pair from $SP
5. For each process $j$ in $ClusterOfSeedProcess
6.    $NewMembers = BuildAClusterWithGivenSeed($j$, $SP$)
7.    Add $NewMembers to $ClusterOfSeedProcess
8. Return $ClusterOfSeedProcess

FIG. 4C

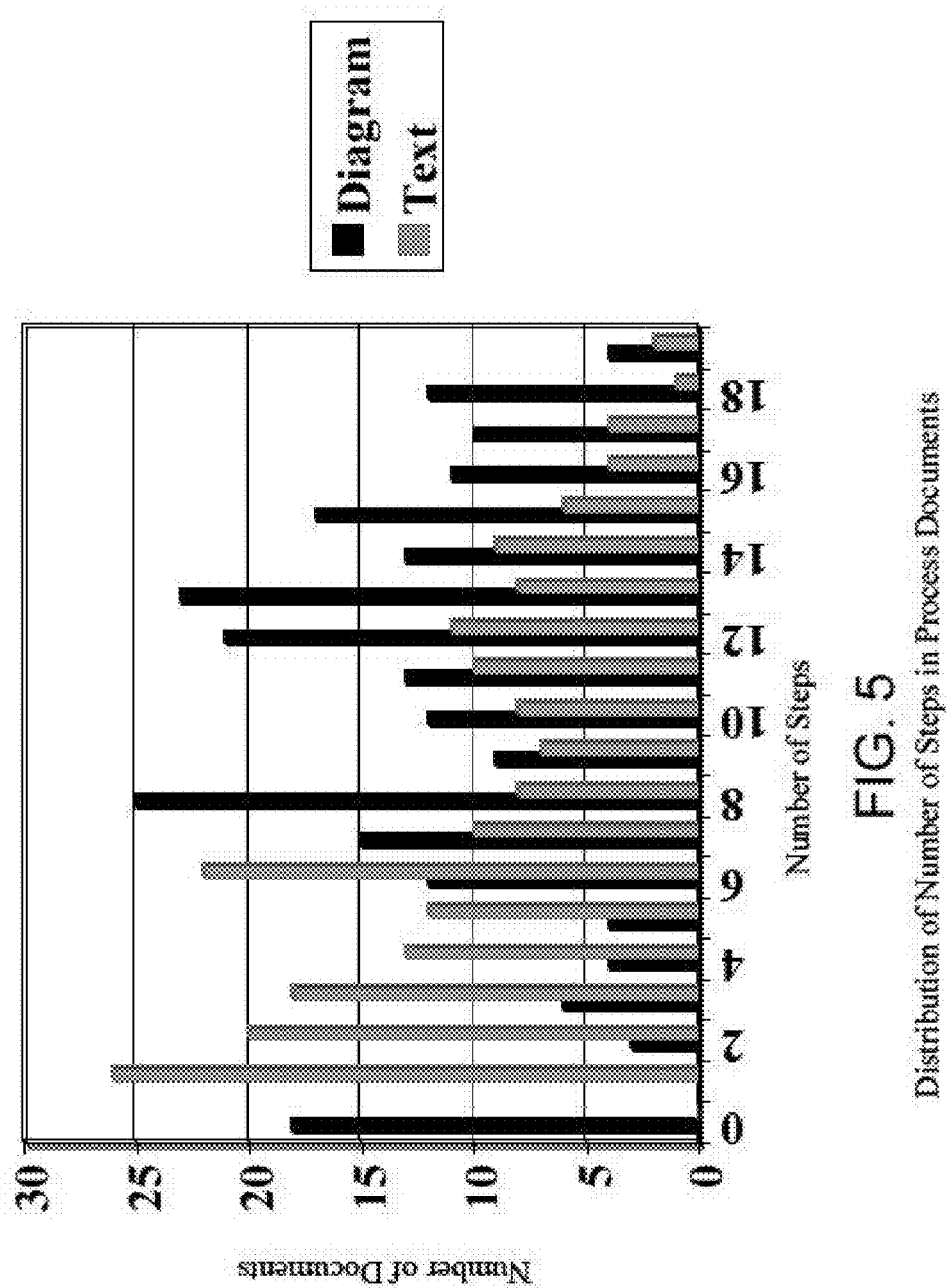

Clusters discovered among 240 process documents from a live project.
Each node represents a document

SYSTEMS AND METHODS FOR ORGANIZING DOCUMENTED PROCESSES

BACKGROUND

Business Process Management (BPM) envisages business processes at the center of all activities including Information Technology (IT) transformations. Organizing documented business processes becomes important because enterprises want to analyze existing documentation to gain insights. However, applying BPM during transformational exercises in large enterprises remains a challenge since dealing with voluminous documentation of the 'as-is' or 'to-be' state of business has proven to be particularly difficult.

The business processes are not only numerous but also documented in multiple representations. For example, a process' textual description can be in Microsoft® Word while the behavior can also be represented as a flow diagram in Visio® with overlapping and additional content. Microsoft®, Windows®, Windows NT®, and the Windows® logo are trademarks of Microsoft Corporation in the United States, other countries, or both.

Since drafting business process information generally involves large teams, inconsistencies often creep in various descriptions of the same process. Methods and tools provisioning a consolidated single view of business process related information can give a huge boost to adoption of BPM principles.

BRIEF SUMMARY

Embodiments of the invention provide systems, apparatuses, methods and program products for applying Business Process Management (BPM) to enterprises having business processes that are not only numerous but also documented in an engagement in multiple representations. Embodiments of the invention reconcile and organize documented information about processes into groups that convey inter-process similarity. The discovered knowledge can be used by embodiments of the invention for many applications to find process clusters that significantly boost performance.

In summary, one aspect of the invention provides a system comprising: one or more processors; a program storage device tangibly embodying a program of instructions executable by the one or more processors, the program of instructions comprising: computer program code configured to extract one or more process descriptions from one or more process documents, the one or more process documents comprising one or more of flow documents and text documents; computer program code configured to represent the one or more process descriptions from the one or more process documents in separate canonical representations; and computer program code configured to compare the separate canonical representations.

Another aspect of the invention provides a method comprising: utilizing one or more processors to execute of instructions tangibly embodied on a program storage device, the program of instructions comprising: computer program code configured to extract one or more process descriptions from one or more process documents, the one or more process documents comprising one or more of flow documents and text documents; computer program code configured to represent the one or more process descriptions from the one or more process documents in separate canonical representations; and computer program code configured to compare the separate canonical representations.

A further aspect of the invention provides a computer program product comprising: a computer readable storage medium having computer readable program code embodied therewith, the computer readable program code comprising: computer program code configured to extract one or more process descriptions from one or more process documents, the one or more process documents comprising one or more of flow documents and text documents; computer program code configured to represent the one or more process descriptions from the one or more process documents in separate canonical representations; and computer program code configured to compare the separate canonical representations.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 1 (A-B) illustrates a process definition document according to an embodiment of the invention.

FIG. 4 (A-C) illustrates an exemplary clustering algorithm and novel method to measure distance between processes according to an embodiment of the invention.

FIG. 5 illustrates a distribution of the number of steps in the diagrammatic and textual descriptions of business processes according to an embodiment of the invention.

DETAILED DESCRIPTION

Figure 2:
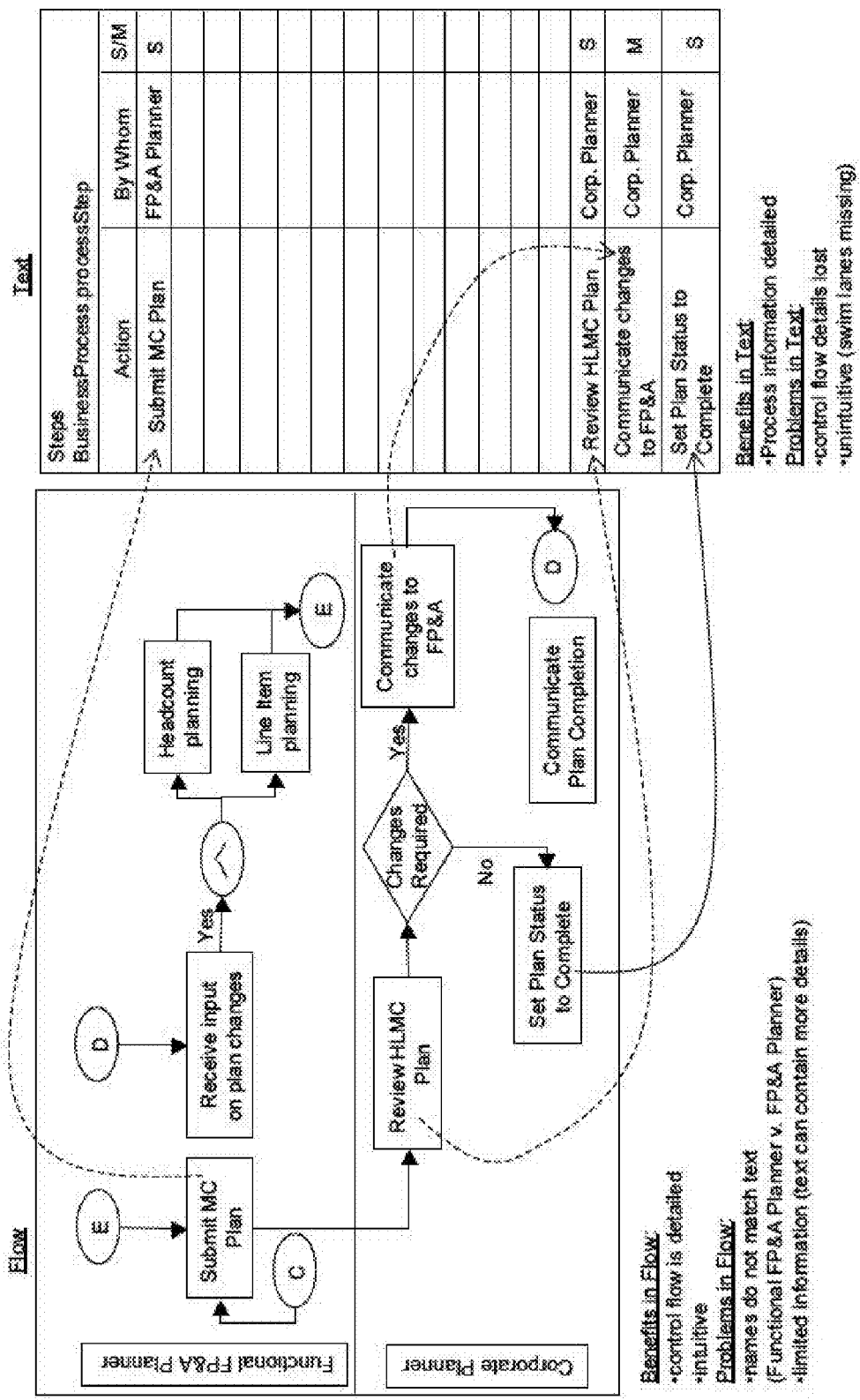
FIG. 2 illustrates a flow description for an example process according to an embodiment of the invention.

It will be readily understood that the components of the embodiments of the invention, as generally described and illustrated in the Figures herein, may be arranged and designed in a wide variety of different configurations in addition to the described exemplary embodiments. Thus, the following more detailed description of the embodiments of the invention, as represented in the Figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The inventors have observed that a host of design information viz. requirements, performance indicators, gap specifications, which are useful in downstream design and realization of IT systems, are captured alongside business process descriptions in process documentation. Thus, linking such ancillary artifacts to organized process information can yield a more comprehensive framework wherein one can also harvest critical non-process artifacts that are effective in context of a business process.

Research in BPM has focused on efficiently harvesting process modeling information captured in BPMN, YAWL and other workflow languages. Techniques to precisely measure similarity in process structure and semantics have evolved over time. Process mining research has addressed the problem of extracting process structure from execution logs. But, discovering and organizing process information present in blueprint documents has not received significant attention. Also, the power of maintaining non-process design artifacts alongside process information has remained understated. Accordingly, embodiments of the invention utilize a framework through which enterprises can gain insight from legacy content of previous projects by consolidating different manifestations of process information, organizing similar business processes into groups and reusing it productively.

Exemplary embodiments of the invention employ a solution which can broadly be described to consist of first reconciling process description from multiple representations to produce an enhanced process definition that corrects and extends the original description(s). Then, a novel method is employed to compare compatible fragments of process information to arrive at inter-process distance. This information is now used to analyze all the processes and provide logical clusters of similar processes. This exemplary method has been tested on a dataset consisting of hundreds of processes documented in Word® and Visio®, and could find meaningful process clusters. Embodiments of the invention have validated the usefulness of process clusters by utilizing them to find related non-process information fragments. In an empirical evaluation on a large set of process artifacts, it was found that according to embodiments of the invention, similar processes also exhibit a high degree of similarity in the ancillary non-process information pieces that are linked to them. Thus, when a consultant is interested to find performance indicators in context of the Accounts Receivable process, he or she may find performance indicators written for other processes belonging to the same cluster as Accounts Receivable to be particularly useful.

It will be appreciated that among other benefits, one benefit offered by embodiments of the invention is that enterprises can now get a more complete picture of their processes while the users can continue to use multiple representations as their methodology demands. Thus, exemplary and non-limiting contributions offered by various embodiments of the invention include but are not limited to:

1) Providing a method to link a set of processes' textual and graphical (flow) descriptions together.

2) Providing a method to enhance, correct and normalize the description of a business process by using both its flow and textual documentation.

3) Providing a method to discover process clusters using their documentation.

4) Empirically proving that the degree of similarity of ancillary non-process information pieces is higher within process clusters.

5) Demonstrate that the process clusters are helpful in practice in applications like search.

The description of exemplary embodiments of the invention first gives some motivating examples and analysis of the problem(s). Thereafter, a description of exemplary embodiments of the invention is given. Moreover, performance evaluations of various embodiments of the invention are given.

The description now turns to the Figures. The illustrated embodiments of the invention will be best understood by reference to the Figures. The following description is intended only by way of example and simply illustrates certain selected exemplary embodiments of the invention as claimed herein.

The flowchart and block diagrams in the Figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a non-limiting example consistent with embodiments of the invention, consider a situation where business process information is used heavily, namely, implementation of a packaged Enterprise Resource Planning (ERP) system. A packaged ERP application provides common business functions and processes, embodies industry best practice processes, allowing an enterprise to leverage experience of others. An ERP implementation can easily touch upon hundreds of business processes.

Standard process taxonomies like American Product and Quality Center's (APQC's) Process Classification Framework$^{SM}$ (PCF) provide basic knowledge of all possible business processes but not enough details to implement an IT transformation like ERP. Consultants in ERP service engagements have to chart out all business processes of the client in great detail and create extensive blueprints for realizing transformations. Hence, organizing process documentation of such projects is of high importance. Consider the example of a business process documented in a textual format on a large ERP project. The document, sometimes called Process Definition Document (PDD), covers information on process name and description, details of process steps, inputs and outputs to every process step as well as non-process information such as suppliers, performance indicators, risk considerations, compliance requirements, et cetera. American Product and Quality Center's (APQC's) Process Classification Framework$^{SM}$ (PCF) is a service mark of American Product and Quality Center in one or more countries.

FIG. 1 (A-B) shows an example PDD. Note that process steps are detailed in a table with attributes like step name, role and characteristic of activity. The benefit of textual description is that all aspects of the process can be explained in detail without any restriction on format or page size. However, behavioral aspects of the process (that is, the control and data flow among its steps) may be more succinctly captured in a graphical (flow) description of the process using a simple-to-use tool like Visio®.

In FIG. 2, the flow description for the example process is shown. The benefits of flow representation is that the control flow is detailed and intuitive. However, a drawback is that the process description has to be restricted due to physical limitation of screen and pages. Also, non-process information pieces are not usually linked to flow descriptions. Nevertheless, having at least one textual description of the process and another graphical description is very common.

Having multiple representations can invariably lead to inconsistencies, especially in ERP, as many people are involved in a project and the descriptions can be from different people with differing assumptions. For example, the names in (flow) graphical and textual descriptions of the example process do not match (Functional FP&A Planner v/s (FP&A Planner)). Also, information in a (flow) diagram can be omitted due to space reasons. For example, "Whether an activity is system or manual?" (S/M, where "S" signifies "system" and "M" signifies "manual"), the text sample has the details but the flow does not.

To summarize, enterprises contain a lot of process information implicit in documents (semi-structured or unstructured text and flow diagrams), but they are not strung together to present a comprehensive view of the state of business. Organizing related process information can provide a single view of truth in context of a particular engagement and can also help to "assetize" process artifacts and reuse them across projects. Again, linking ancillary non-process information to process elements and maintaining them in the same light can be beneficial in boosting reuse of non-process (but often critical) design information.

Problem Formulation

In a typical project, there will be a large collection of process documents (PDs), $D=d_1 \ldots d_n$. The documentation of a process $p_i$ is referred to by $d_i$. The document consists of different information pieces tagged by labels, $T=\{t_1, \ldots, t_k\}$. A publicly available tool that can help tag documents created by Microsoft Word® applications is IBM® Content Harvester. The content of an information type will be denoted $t_j$ in document $d_i$ by $d_i(t_j)$. Now the content $d_i(t_j)$ can be anywhere in the document, for example, inside a section, sub-section, and cell of a table.

The project can also decide to document the graphical representation of the process' behavior, called process flow, either inside the process document or separately. A process flow is made up of nodes representing activity, edges representing dependency, and optionally additional annotations like business objects, resources, organizations, et cetera. If the process flow is inside the document, it has the tag BusinessProcess.flow. If the process flow is kept separate from process' textual description, and not within it, $D^f=d_1^f \ldots d_n^f$ in addition to D. $d_i^f$ is called as process flows (PFs). All $d_i(t_j)$, other than process flows, can be structured as any one from the following:

a continuous text, called single content
a list of text, called content list
a table of text, called content table Consider FIG. 1 (A-B). Content for different tags are in table cells and sections of the document. The tags $t_j$s are BusinessProcess.description, BusinessProcess.KPI, BusinessProcess.requirements, BusinessProcess.steps, BusinessProcess.inputs, BusinessProcess.outputs, BusinessProcess.triggers, et cetera. The content $d_{example}1$ (BusinessProcess.requirements) is a list in FIG. 1A, while $d_{example}1$ (BusinessProcess.steps) is a table in FIG. 2.

For a project, let D and $D^f$ represent the process documents and process flows created, respectively. The problems considered are:

Linking problem: Link each $d_i \in D$ with the corresponding $d_i^f \in D^f$.

Normalization problem: Have the information about the process steps in a consolidated form across text $d_i$(BusinessProcess.steps) and flow, $d_i^f$.

Grouping problem: Find groups (clusters) of similar processes based on their documented details, that is, find $G=\{g_1, \ldots, g_k\}$ where $g_i \subseteq D$ such that when $d_m, d_n \in g_i$, $p_m \approx p_n$.

Solution Approach

Now discussed herein is how each problem is addressed by various embodiments of the invention.

Linking Process Information

The first step in organizing processes through an exemplary proposed solution involves preparing process repositories. Service vendors accumulate a large number of text documents as well as diagrams depicting business processes that they configure as part of ERP engagements. The rich business process information captured in these documents may be effectively reused in future engagements after cleansing any client specific information present in them. Such repositories of documentation are scanned to establish linkages between existing designs that pertain to identical or similar business processes.

A simple method of comparing a textual listing of process steps with a process flow diagram involves computing the fraction of "common" steps between them. Two process steps $s_i$ and $s_j$ are said to be equivalent if they have similar names and also exhibit/demonstrate a high degree of aggregated similarity in names of their predecessors(P), succesors(S), inputs(I) and outputs(O).

$$\theta_a(s_i, s_j) = w_t \times \theta_t(s_i, s_j) + \Sigma x \Sigma s_i^n \epsilon x(s_j)^{sim_t(s_i^n, s_j^n)}$$

where $\theta_t$ may be any test similarity measure, viz. Levenshtein, Monge Elkan et cetera, x=P, S, I, O, and $\theta_a$ is the overall similarity. Finally, the two listings match if the fraction of similar steps is significant as per user defined thresholds. Although the above method works well in practice, one can also define more sophisticated measures of comparing process flows based on ontologies and interesting graph edit distances.

Normalizing Steps

As discussed herein, business process of the client is central to all activities in any ERP engagement. With process centric methodology gaining momentum, the business process description is getting captured in increasingly greater detail. Again, the process description often comes in various manifestations both as text and as diagrams. Thus, a canonical representation of the business process flow may yield the following benefits.

Enrichment of Process Information:

Process step information is present in varying degree of detail across different kinds of documents. Whilst the process flow diagram crisply depicts the dependencies between the steps, a detailed textual description of the activities performed as part of a step is available in a process definition document. Embodiments of the invention aim to consolidate these pieces of information at one place in a normalized representation of a process step.

Consistency and a Single View of Truth:

Since, same information is contained in multiple documents, which are constantly being updated, guaranteeing the fact that the information being referred is not stale becomes a challenge. A single view of truth having consolidated information can help in alleviating inconsistencies.

More Structured Information:

A structured representation would enable greater precision in harvesting process information for search and other purposes.

Embodiments of the invention utilize a normal form of process step that contains placeholders for all facets of information that are usually linked to a step. The normal form contains the following:

1. Name: A short name for the step.
2. Description: A detailed description that enables all further design/realization pertaining to the step.
3. Role: The entity (may be person/organization/machine) responsible for realizing the step.
4. Predecessors: The set of steps preceding the step in question.
5. Successors: The set of steps following the step in question.
6. Input: Data input (if any) to the step.
7. Output: Data output (if any) from the step.
8. Nature: Whether the step is manual/automatic
9. Miscellaneous: A placeholder for any other kind of information.

Figure 3:
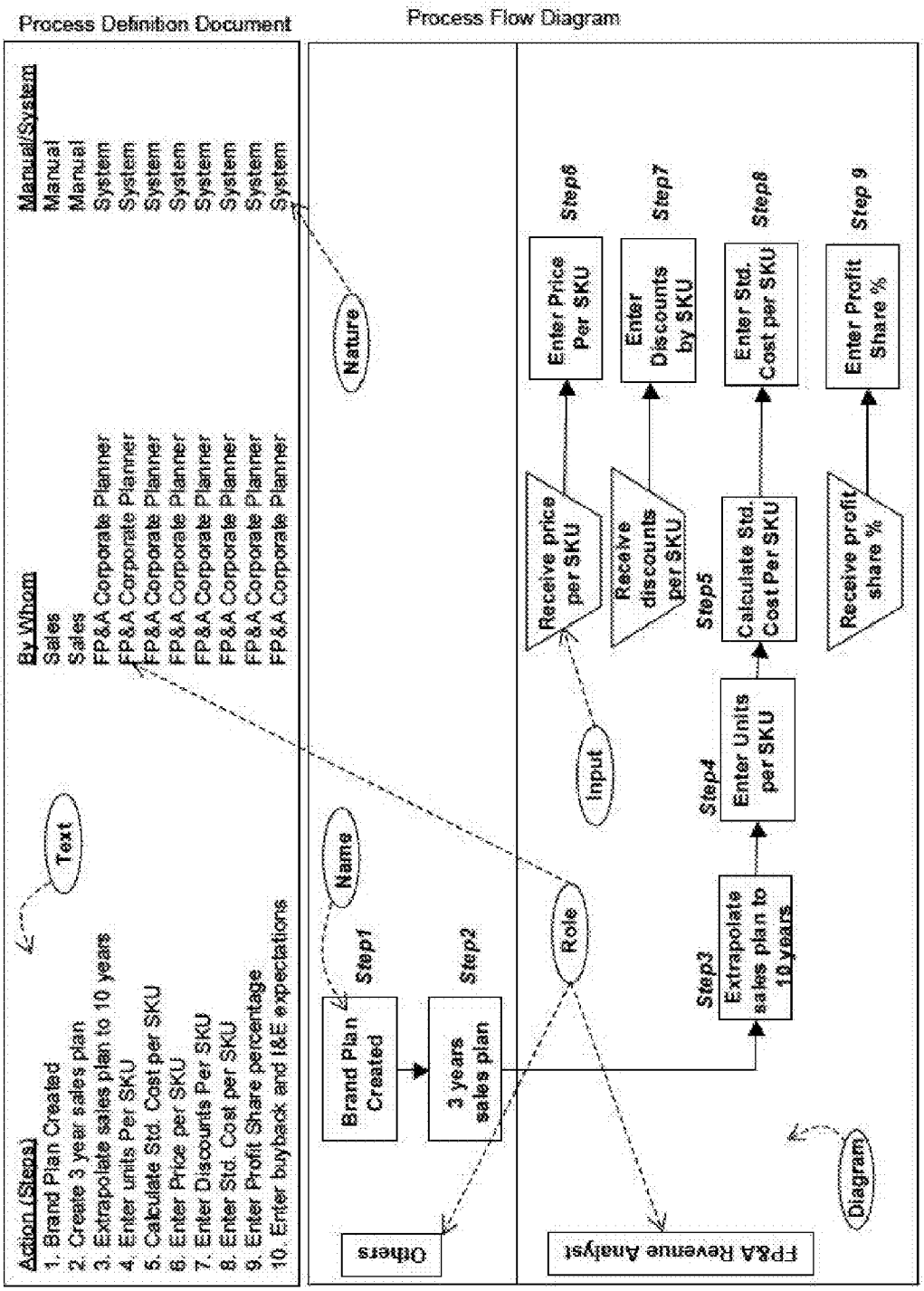
FIG. 3 illustrates table of process steps present in a process definition document and contrasts it with the corresponding process flow diagram according to an embodiment of the invention.

Typically, a diagrammatic representation of the process flow will unambiguously capture name, role (through a swimlane), predecessors, successors, input and output for every step. The detailed step description may be mined from the text in process definition documents. FIG. 3 shows table of process steps present in a Process definition document and contrasts it with the corresponding process flow diagram. Certain features are present only in one form of document and thus there is scope of enrichment of process information through consolidation. For example, in FIG. 3, the nature of a step is captured solely in text whereas the inputs for a step are explicitly indicated only in the flow diagram. Inputs and outputs for a step may be specified as nodes in the flow graph or as labels on the incoming and outgoing edges of a step node. Also, notice that the role responsible for Steps 1 & 2 is "Sales" according to the step table whereas this role is under-specified (stated to be "Others") in the process flow. In such cases where merging of the same feature becomes non-trivial, human intervention can be sought. One approach is using advanced text analytics to automatically discover complex merging rules.

Grouping Processes

For grouping processes based on their documentation, clustering algorithms provide a natural solution framework except that the distance function has to be provided between (linked and normalized) processes documentation. Details of an exemplary clustering algorithm and novel method to measure distance between processes according to embodiments of the invention further herein; the main steps are shown in FIG. 4 (A-C).

The steps consist of first finding pairs of similar processes using the documents' comparably tagged contents and then using pair-wise similarity with standard transitive closure techniques to build clusters of overall equivalent processes. Since content for a tag itself can be structured in different ways, the exact matching steps need to take care of content structuring. The scores are then aggregated to determine complete pair-wise document similarity. It should be noted that there are many alternatives for building similarity scores and the selection of one approach over another only reflects in the quality of the overall clusters. The aim of the examples given herein is to demonstrate the overall feasability and usefulness of process comparison approach; fine tuning to pick the best measure for an application is considered within the scope and spirit of the exemplary embodiments of the invention discussed herein. The description now gives some details of how, according to various embodiments of the invention, the similarity of documents is determined from their tags and content structure.

Comparing Content of Same Tag

Comparing Two Single Contents

Let $\theta(s_i,s_j)$ represent the similarity score of two single contents (strings), $s_i$ and $s_j$. There are many choices for $\theta$. Let $\sqsupseteq$ be the binary substring operator to check if the first argument contains the second argument. One measure is defined:

$$\theta_1(s_i,s_j)=1, if(s_i \sqsupseteq s_j)\lor(s_j \sqsupseteq s_i)$$

0, otherwise

Another measure is also called Monge-Elkan ($\theta_2$) from the many standard string matching metrics available. $\theta_1$ is more strict than $\theta_2$ but faster to compute. Now $s_i$ is similar to $s_j$, denoted by $s_i \approx s_j$, if $\theta_{si}(s_i,s_j) \succ \phi$, where $\phi$ is some threshold.

Comparing Single Content and Content List

Let $\theta(s_i,l_j)$ represent the similarity score of a single content $s_i$ with a content list $l_j$. The following measure can be used:

$$\theta_{sl}(s_i, l_j) = 1, i\ f(s_i \approx s_k^l \mid \exists\, s_k^l \in l_j)$$

0, otherwise

Now $s_i$ is similar to $l_j$, denoted by $s_i \approx l_j$, if $\theta_{sl}(s_i,l_j) \neq 0$.

Comparing Single Content and Content Table

Let $\theta_{st}(s_i,t_j)$ represent the similarity of a single content $s_i$ with a content table $t_j$. The Following measure can be used:

$$\theta_{st}(s_i, t_j) = 1, i\ f(s_i, \approx s_k^l \mid \exists\, s_k^l \in t_j)$$

0, otherwise

Now $s_i$ is similar to $t_j$, denoted by $s_i \approx t_j$, if $\theta_{st}(s_i,t_j) \neq 0$.

Comparing Two Content List

Let $\theta(l_i,l_j)$ represent the similarity score of two content lists, $l_i$ and $l_j$. The measure used is:

$$\theta_{ll}(l_i, l_j) = \frac{|(s_i \approx s_j) \mid s_i \in l_i, s_j \in l_j|}{\mathrm{Max}(|l_i|, |l_j|)}$$

Now $l_i$ is similar to $l_j$, denoted by $l_i \approx l_j$, if $\theta_{ll}(l_i,l_j) \neq 0$.

Comparing Content List and Content Table

Let $\theta(l_i,t_j)$ represent the similarity score between the content list $l_i$ and content table $t_j$. The measure used is:

$$\theta_{lt}(l_i,t_j)=\mathrm{Max}(\theta(l_i,l_t^k)|l_t^k \in t_j)$$

That is, it is considered to be the maximum score between the list and any column of the table. Now $l_i$ is similar to $t_j$, denoted by $l_i \approx t_j$, if $\theta_{lt}(l_i,t_j) \neq 0$.

Comparing Two Content Tables

Let $\theta_{tt}(t_i,t_j)$ represent the similarity score of two content tables, $t_i$ and $t_j$. The following measure can be used:

$$\theta_{tt}(t_i, t_j) = i\ f(t_i^{|cols|} == t_i^{|cols|}),$$

$$\text{Max}(\theta(s_i, s_j)) \mid s_i \in t_i, s_j \in t_j$$

$$0, \text{otherwise}$$

Now $t_i$ is similar to $t_j$, denoted by $t_i \approx t_j$, if $\theta_{tt}(t_i,t_j) \neq 0$.

Comparing Two Process Documents

The similarity of two processes documents, $d_i$ and $d_j$, is measured by $$\theta_{dd}(d_i, d_j) = \frac{\sum_{a=1...k} |d_i, (t_a) \approx d_j(t_a)|}{\text{Max}(d_i(T_i), d_j(T_j))}$$

That is, the similarity score is computed by aggregating the similarity score of content of common tags in both documents. $d_i$ is similar to $d_j$, denoted by $d_i \approx d_j$, if $\theta_{dd}(d_i,d_j) \succ \phi$. If $d_i \approx d_j$, then $p_i$ is similar to $p_j$.

Experiments were conducted using various exemplary embodiments of the invention on a set of 240 process definition documents and 315 process flow diagrams that were authored in the context of a large ERP engagement. It was not known if all process documents had the corresponding process flows or vice-versa. The aim was to check the effectiveness of methods consistent with embodiments of the invention for the link, normalize and group problems, and show the benefit of the results.

Linking Process Documents and Flow Documents

The first step in the empirical evaluation involved trying to establish link across process documents (PD) and process flow (PF). However, first the characteristics of the two types of documents were examined to set the right result expectation. FIG. 5 shows a distribution of the number of steps in the diagrammatic and textual descriptions of business processes.

As shown:

The step description in PD and PF follow different distribution of steps. The PDs tend to have small number of steps while PFs have large number of steps.

The PDs are expected to be without corresponding PFs and vice-versa. From the data, only those processes (171 PDs and 294 PFs) that have greater than 2 step were considered for this purpose. Experiments with a host of standard text similarity measures were conducted to match step names across processes captured in these two sets. The Second string library of similarity measures available in Java was used. The Jaro similarity measure, which is known to be effective in matching short string records, gave best results. The threshold was carefully set for defining a match in step names so that a fair degree of precision and recall was obtained. Also, the exact string comparison function in Java was used. Table 1 has the results. Here, candidate matches refers to the number of PD-PF matches that were above minimum threshold to be considered candidates for links. A total of 126 matches involving 30 PDs were found. The validity of the matches was manually verified in order to compute precision to be 48%. When using exact string comparison to match step names, the method found matches for only 11 PDs (all of them match 1 flow each) but resulted in 100% precision. Since it is not know how many PDs had PFs are in the collection, recall cannot be calculated.

TABLE 1

Results in PD-PF link experiment.

| String Measure($\theta$) | # Candidate Matches | PDs | Precision (%) |
|---|---|---|---|
| $\theta_{jaro}$ | 126 | 30 | 48 |
| $\theta_{Exact}$ | 11 | 11 | 100 |

It should be noted from the results that accuracy of the method depends on the string measure but can be high. However, since the candidate number of matches were small, the recall is likely to be low. This indicates that the method can be a helpful guide to someone who is manually linking PDs to PFs but in itself, the method will not be able to link a lot of data.

Normalizing Process Step Information

An experiment was conducted to check if there is value in automatically trying to normalize the process information in the document and flow for those that matched as output of the linking method. In the dataset, there were 3 features in PD and 6 features in PF while the normalized output has 7 features. Step name and role are common attributes across PD and PF while description and miscellaneous are not available in the dataset after linking experiment. It should be noted that any step that can be matched and normalized would have more information than what would have been seen in any individual document. Table 2 has the results. The results show that there is a good potential for automatically normalizing steps across PDs and PFs.

TABLE 2

Results in automatic PD-PF Normalization experiment for matching documents.

| String | (%) Match (Name) | (%) Match (Name + Role) |
|---|---|---|
| $\theta_{jaro}$ | 37 | 8 |
| $\theta_{Exact}$ | 45.5 | 13 |

Figure 6:
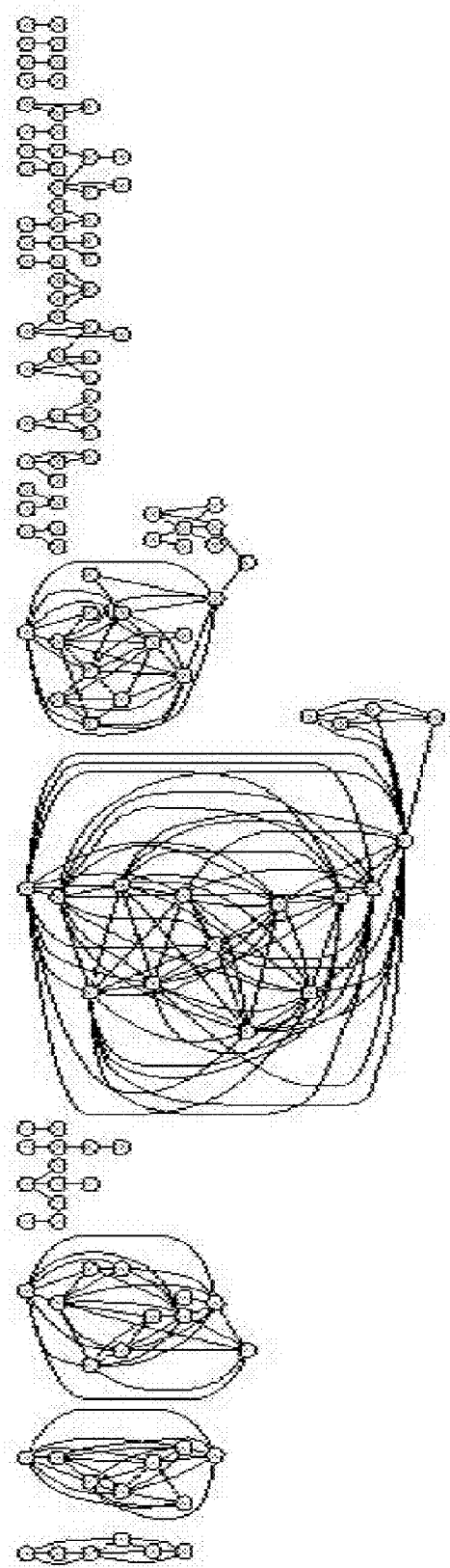
FIG. 6 illustrates clustered out put of process documents from an engagement that were examined according to an embodiment of the invention.

Finding Clusters of Processes 240 process documents from an engagement were examined. They were harvested with Content Harvester and different information types were tagged. The threshold for document similarity $\phi$ was set at 20% match level while $\theta_1$ was used for string similarity. The output is shown in FIG. 6. Some statistics about the output are:

Number of pair-wise similar processes=266.

Number of clusters found=23.

Range of cluster sizes=(2, 21).

Number of documents in some cluster=134 (i.e., 55% of total).

It should be noted that only slightly more than half of the processes are similar to some other process, but there are large groups of similar processes. The groupings were manually inspected for correctness using other information from the original project, and they were mostly correct (measuring absolute correctness is not possible since the original experts of the project were not available).

Benefit Discovered Clusters

It is now show that the process grouping information can be used for beneficial applications according to various embodiments of the invention. Among all the information types that are documented on processes for a project, there are many which are process-independent. Consultants frequently want to answer queries like, "find all requirements across all available processes that are similar to those of the Account Receivable process". For different information types (tags), the average similarity of non-process content between processes in the same cluster versus any random two processes.

Table 3 shows the results. Column 2 has:

$$\text{Avg}(\theta(d_i(t_k),(d_j(t_k))),d_id_j \in \exists g_m$$

while Column 3 has:

$$\text{Avg}(\theta(d_i(t_k),(d_j(t_k))).$$

Column 4 is (Column2-Column3/Column3) as percentage. For all tags evaluated, the average similarity within the cluster was 2-3 orders of magnitude higher than what was present without utilizing embodiments of the invention. Hence, any search application for processes can boost its performance by using just the process clustering information before any input is sought from the user. Since it is intuitively true that same/similar non-process design information shall be linked to similar processes, the experiment also proves that the clusters found by embodiments of the invention indeed group meaningful processes together.

TABLE 3

Effectiveness of discovered clusters in boosting similarity of process' information sub-types (tags).

| Information Sub-Type (Tag) | Avg. in Cluster | Avg. Overall | Similarity Boost (%) |
|---|---|---|---|
| BusinessProcess.requirement | 0.209 | 0.014 | 1430.55 |
| BusinessProcess.integrationConsideration | 0.620 | 0.115 | 438.54 |
| BusinessProcessleanSigma.input | 0.242 | 0.0336 | 620.75 |
| BusinessProcessleanSigma.output | 0.228 | 0.011 | 1941.50 |
| BusinessProcessleanSigma.supplier | 0.844 | 0.109 | 671.22 |

APQC's PCF$^{SM}$ is a standard for terminology on process definitions and measures for benchmarking. APQC's PCF$^{SM}$ can be used in many contexts where people, data and IT need to be organized around the business area that they impact. Similarly, software vendors like SAP® also provide high-level process documentation via their tools like SAP® Solution Composer. However, such high-level documentation states what a business can broadly do whereas process documents as considered herein are a detailed account of how a business function will be implemented and performed. SAP® is the trademark or registered trademark of SAP AG in Germany and in several other countries.

There is extensive literature on similarity of business process models and equivalence of process structures. However, they only work with well defined process workflow structures and do not consider process documentation available as semi-structured or unstructured text. Again, process mining efforts and tools have focused on building processes from execution traces. Unlike various embodiments of the present invention, prior work in BPM does not try to mine process information from documents.

According to the exemplary embodiments of the invention as described herein, it was not assumed that any metadata from the repository that stored the process documentation was available. While this harder situation is a reality in actual settings, if such information were available, it would simplify the problem. Specifically, it will (a) reduce or even eliminate linking sub-problem where corresponding text and flow documentation are associated, and (b) could be used while solving the grouping sub-problem since processes known to originate from same repository category can be given more weight while comparing similarity.

To briefly recap, according to various embodiments of the invention, the problem of organizing process information that exist in enterprise repositories is addressed. Embodiments of the invention utilize a solution consisting of first reconciling process description from multiple representations to produce an enhanced process definition that corrects and extends the original description(s). Then, embodiments of the invention define a novel method of computing inter-process distance using compatible fragments of process information and build meaningful clusters of similar processes. In testing on a large dataset consisting of hundreds of processes documented in Microsoft® Word and Visio®, where embodiments of the invention could link processes' textual and flow documents, normalize step information and find process clusters that significantly boosted search performance.

Embodiments of the invention may be implemented in one or more computing devices configured appropriately to execute program instructions consistent with the functionality of the embodiments of the invention as described herein. In this regard, FIG. 7 describes a non-limiting example of such a computing device.

Figure 7:
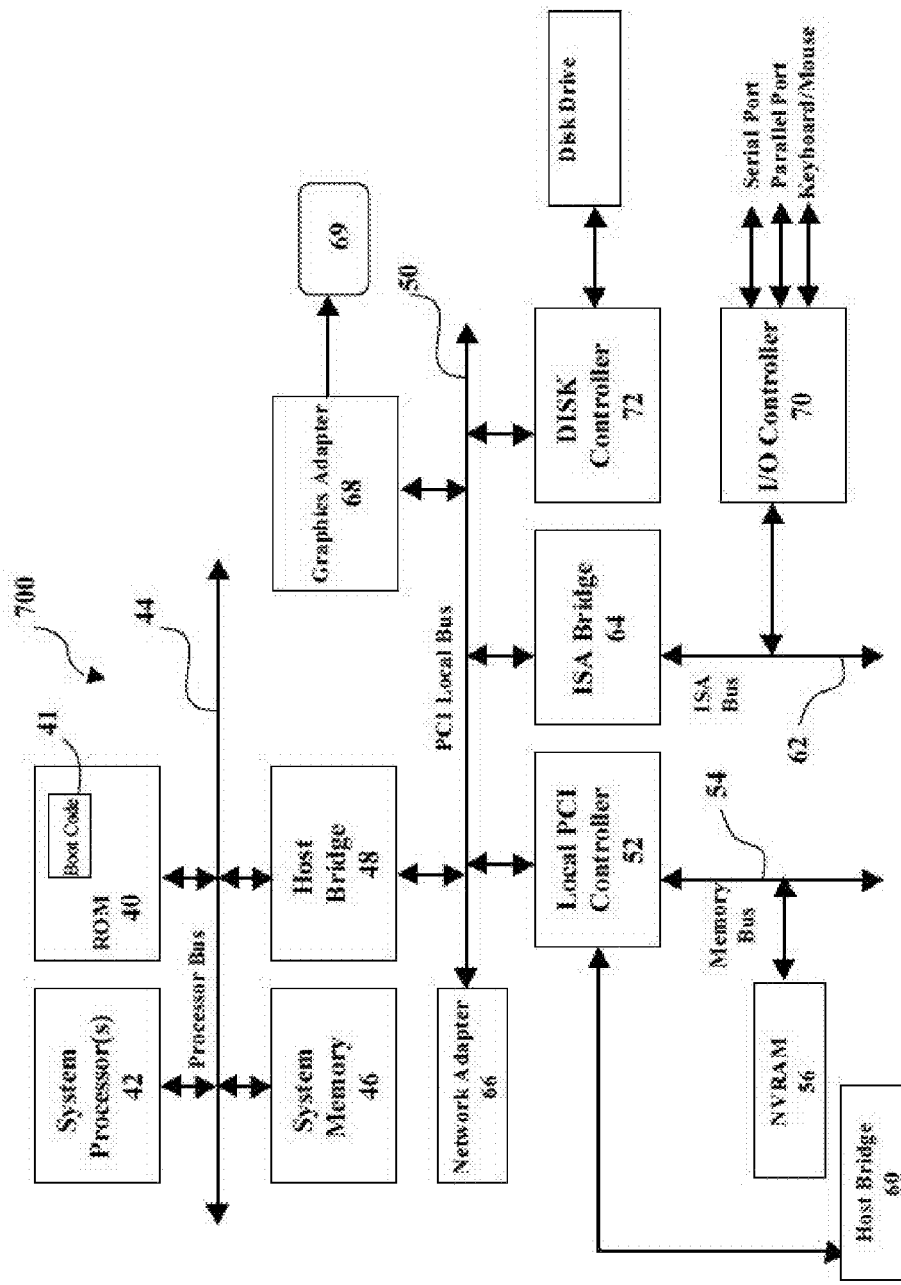
FIG. 7 illustrates an exemplary computer system according to an embodiment of the invention.

Referring now to FIG. 7, there is depicted a block diagram of an illustrative embodiment of a computer system 700. The illustrative embodiment depicted in FIG. 8 may be an electronic device such as a desktop computer, workstation computer, laptop computer, mobile computing device and the like. As is apparent from the description, however, the embodiments of the invention may be implemented in any appropriately configured device, as described herein.

As shown in FIG. 7, computer system 700 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 700 to LAN, and graphics adapter 68, which interfaces computer system 700 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 700 further includes Industry Standard Architecture (ISA) bus 62, which is coupled to PCI local bus 50 by ISA bridge 64. Coupled to ISA bus 62 is an input/output (I/O) controller 70, which controls communication between computer system 700 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
   one or more processors;
   a program storage device tangibly embodying a program of instructions executable by the one or more processors, the program of instructions comprising:
   computer program code configured to extract process descriptions from process documents, the process descriptions comprising process fragments, the process documents comprising at least one flow document and at least one text document, wherein the process description of the at least one flow document comprises a graphical process description;
   computer program code configured to represent the process description from the at least one text document and the graphical process description from the at least one flow document in separate canonical representations;
   computer program code configured to compare process fragments from the separate canonical representations;
   wherein the computer program code configured to compare the process fragments from the separate canonical representations is further configured to assign separate canonical representations to the process fragments from the at least one flow document and the at least one text document;

computer program code configured to determine compatibility of process fragments between the at least one text document and the at least one flow document;
wherein the computer program code configured to determine compatibility of process fragments between the at least one text document and the at least one flow document is further configured to assign similarity scores among pairs of fragments in response to comparing the process fragments;
computer program code configured to link compatible process fragments of the at least one flow document and the at least one process document, via linking at least one process fragment from the graphical process description from the at least one flow document with at least one process fragment from the process description from the at least one text document; and
computer program code configured to compute from the assigned similarity scores an aggregated similarity score between the at least one text document and the at least one flow document.

2. The system according to claim 1, wherein the program of instructions further comprises computer program code configured to disambiguate the process descriptions utilizing one or more of the process fragments.

3. The system according to claim 2, wherein the disambiguation further comprises reconciling the process descriptions to produce an enhanced process definition that corrects and extends the process descriptions.

4. The system according to claim 1, wherein the program of instructions further comprises computer program code configured to augment the process descriptions with information gathered from one or more of the process fragments.

5. The system according to claim 1, wherein the computer program code configured to link the compatible process fragments is configured to build clusters of similar processes, the building comprising computing inter-process distance between the graphical process description from at least one flow document and the process description from at least one text document.

6. The system according to claim 5, further comprising:
one or more user interfaces;
wherein the program of instructions further comprises:
computer readable program code configured to accept a query from one or more users for similar processes contained in the process documents; and
computer readable program code configured to output one or more query results in response to the query.

7. The system according to claim 1, wherein the process fragments from the separate canonical representations comprise one or more of single content strings, single content parts, content list parts, and content table parts extracted from the process documents; and
wherein the computer program code configured to compare the process fragments from the separate canonical representations is further configured to compare: two single content strings; single content parts and content list parts; single content parts and content table parts; parts of two content lists; content list parts and content table parts; and parts of two content tables.

8. A method comprising:
utilizing one or more processors to execute of instructions tangibly embodied on a program storage device, the program of instructions comprising:
computer program code configured to extract process descriptions from process documents, the process descriptions comprising process fragments, the process documents comprising at least one flow document and at least one text document, wherein the process description of the at least one flow document comprises a graphical process description;
computer program code configured to represent the process description from the at least one text document and the graphical process description from the at least one flow document in separate canonical representations;
computer program code configured to compare process fragments from the separate canonical representations;
wherein the computer program code configured to compare the process fragments from the separate canonical representations is further configured to assign separate canonical representations to the process fragments from the at least one flow document and the at least one text document;
computer program code configured to determine compatibility of process fragments between the at least one text document and the at least one flow document;
wherein the computer program code configured to determine compatibility of process fragments between the at least one text document and the at least one flow document is further configured to assign similarity scores among pairs of fragments in response to comparing the process fragments;
computer program code configured to link compatible process fragments of the at least one flow document and the at least one process document, via linking at least one process fragment from the graphical process description from the at least one flow document with at least one process fragment from the process description from the at least one text document; and
computer program code configured to compute from the assigned similarity scores an aggregated similarity score between the at least one text document and the at least one flow document.

9. The method according to claim 8, wherein the program of instructions further comprises computer program code configured to disambiguate the process descriptions utilizing one or more of the process fragments.

10. The method according to claim 9, wherein the disambiguation further comprises reconciling the process descriptions to produce an enhanced process definition that corrects and extends the process descriptions.

11. The method according to claim 8, wherein the program of instructions further comprises computer program code configured to augment the process descriptions with information gathered from one or more of the process fragments.

12. The method according to claim 8, wherein the computer program code configured to link the compatible fragments is configured to build clusters of similar processes, the building comprising computing inter-process distance between the graphical process description from at least one flow document and the process description from at least one text document.

13. The method according to claim 12, further comprising:
accepting a query from one or more users via one or more user interfaces, the query being configured to identify one or more similar processes contained in the process documents; and
providing one or more outputs having one or more query results in response to the query.

14. The method according to claim 8, wherein the process fragments from the separate canonical representations comprise one or more of single content strings, single content parts, content list parts, and content table parts extracted from the process documents; and wherein the computer program code configured to compare the process fragments from the separate canonical representations is further configured to compare: two single content strings; single content parts and content list parts; single content parts and content table parts; parts of two content lists; content list parts and content table parts; and parts of two content tables.

15. A computer program product comprising:

a computer readable storage medium having computer readable program code embodied therewith, the computer readable program code comprising:

computer program code configured to extract process descriptions from process documents, the process descriptions comprising process fragments, the process documents comprising at least one flow document and at least one text document, wherein the process description of the at least one flow document comprises a graphical process description;

computer program code configured to represent the process description from the at least one text document and the graphical process description from the at least one flow document in separate canonical representations;

computer program code configured to compare process fragments from the separate canonical representations;

wherein the computer program code configured to compare the process fragments from the separate canonical representations is further configured to assign separate canonical representations to the process fragments from the at least one flow document and the at least one text document;

computer program code configured to determine compatibility of process fragments between the at least one text document and the at least one flow document;

wherein the computer program code configured to determine compatibility of process fragments between the at least one text document and the at least one flow document is further configured to assign similarity scores among pairs of fragments in response to comparing the process fragments;

computer program code configured to link compatible process fragments of the at least one flow document and the at least one process document, via linking at least one process fragment from the graphical process description from the at least one flow document with at least one process fragment from the process description from the at least one text document; and computer program code configured to compute from the assigned similarity scores an aggregated similarity score between the at least one text document and the at least one flow document.

16. The system according to claim 1, wherein said computer program code configured to link compatible process fragments further comprises computer program code configured to link at least one graphical image in the at least one flow document with text in the at least one text document.

* * * * *